G. HABIG.
MACHINE FOR FILING AND CUTTING METALS AND OTHER MATERIALS.
APPLICATION FILED JULY 6, 1908.
996,329.
Patented June 27, 1911.
3 SHEETS—SHEET 1.
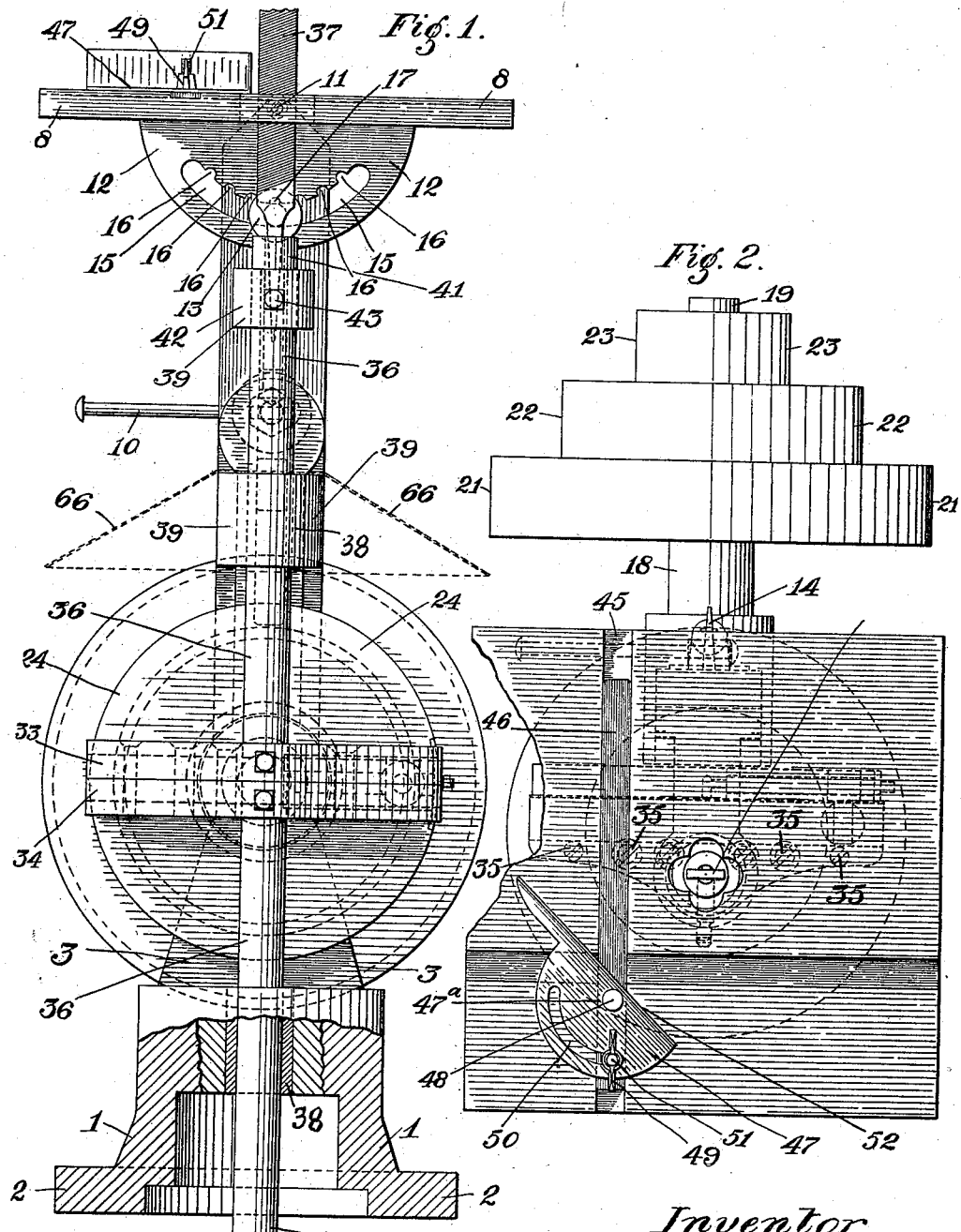
Witnesses
Inventor
George Habig.
By St. John Day.
Attorney.

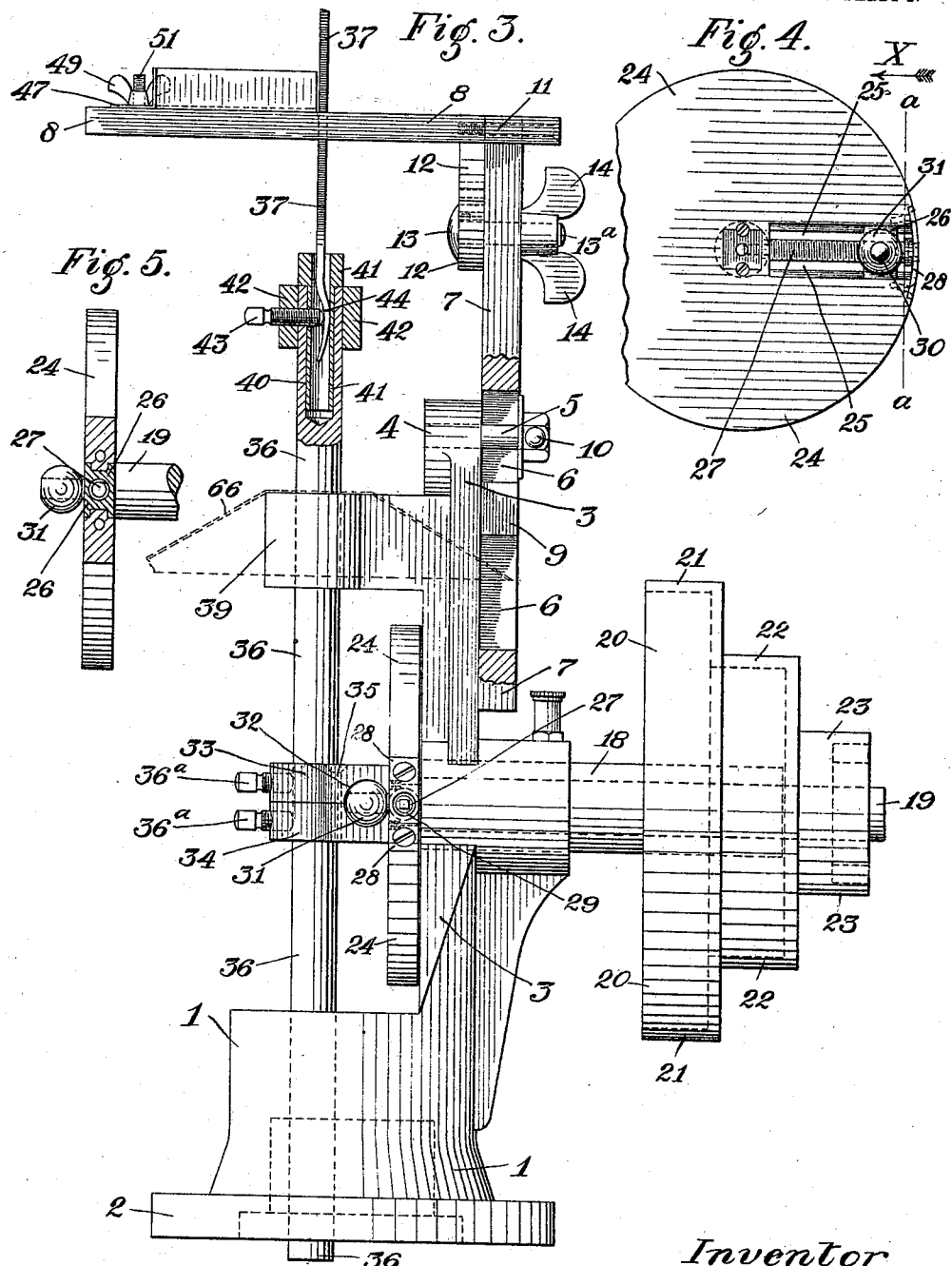

G. HABIG.
MACHINE FOR FILING AND CUTTING METALS AND OTHER MATERIALS.
APPLICATION FILED JULY 6, 1908.
996,329.
Patented June 27, 1911.
3 SHEETS—SHEET 3.
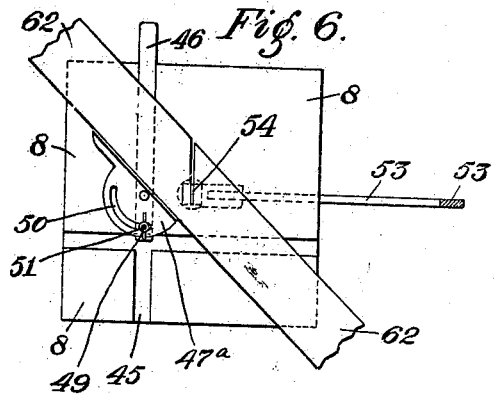
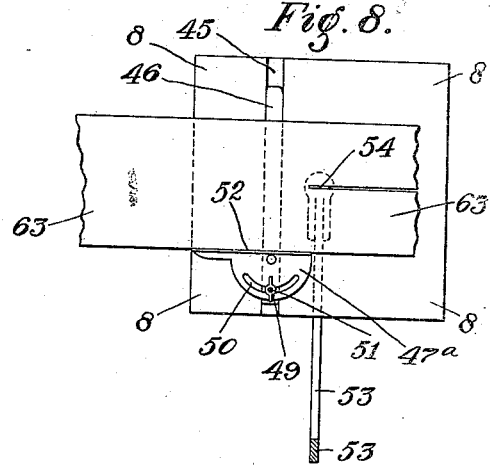
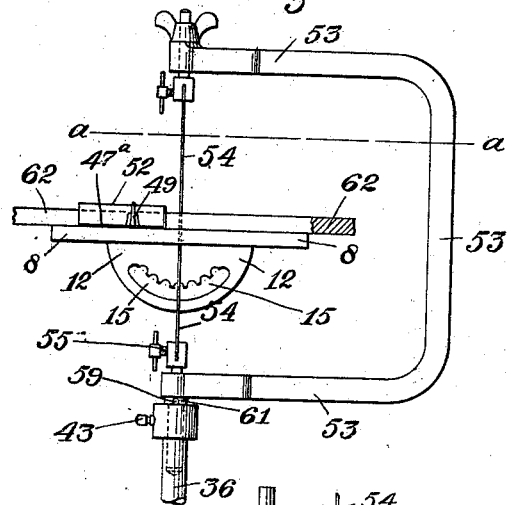
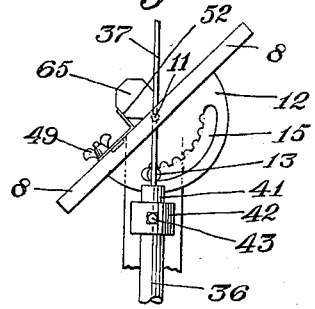
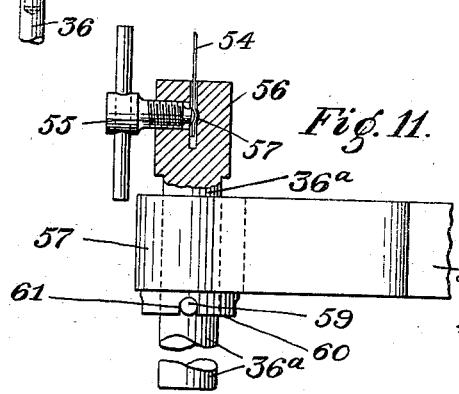
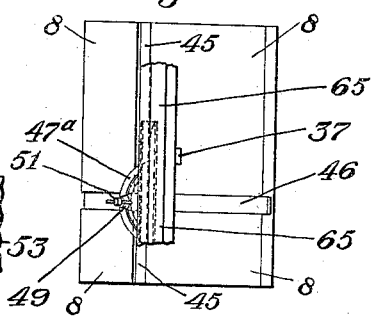
Witnesses
Inventor
George Habig.
John Day
Attorney.

UNITED STATES PATENT OFFICE.

GEORGE HABIG, OF LOS ANGELES, CALIFORNIA.

MACHINE FOR FILING AND CUTTING METALS AND OTHER MATERIALS.

996,329.

Specification of Letters Patent. Patented June 27, 1911.

Application filed July 6, 1908. Serial No. 442,218.

*To all whom it may concern:*

Be it known that I, GEORGE HABIG, of the city of Los Angeles, in the county of Los Angeles and State of California, have invented a new or Improved Machine for Filing and Cutting Metals and other Materials, of which the following is a full, clear, and exact specification, reference being had to the annexed drawings and to the letters and figures marked thereon.

My invention which relates to a new or improved machine for filing and otherwise cutting metals and other substances, is adapted for a variety of purposes, in respect of which filing or cutting operations have to be performed on pieces of metal, wood, stone, insulating substances, and other materials, used in a vast variety of manufacturing operations, for example, in factories where electrical fittings and apparatus are made, in gas fitting manufactories, in cabinet making works, and other works wherein wood is used and requires to be cut to a variety of forms, such for example as in making what are known as miter joints, and other forms or pieces of wood joined together. My invention is applicable to so large a variety of manufacturing purposes that it is not possible to state them in detail, nor is it necessary so to do, more especially as the adaptabilities of the machine constituting my said invention are obvious.

The machine constituting my invention consists of a framing which is preferably adjustable in height as hereinafter described, and shown more particularly by the annexed drawings, and it contains a rotating driving shaft by which a reciprocating member, namely, the filing and cutting rod of the machine is maintained in reciprocating motion. The extent of this reciprocating motion may be varied by means of a screw in a driving crank device which is operated by the attendant to vary the throw of the crank from time to time as required. The file, saw, or other cutting instrument is carried in the upper part of the reciprocating driving rod, and it passes through a hole in the table upon which the material to be filed or otherwise cut is supported during the filing or other cutting operations. This table is capable of being adjusted to, and retained at any required angle with the body of the machine, and corresponding with the several angles or surfaces of the metal or other material to be filed or otherwise cut. A belt driving pulley having driving surfaces of different diameters is carried upon the driving shaft of the machine, and revolves in a bearing in the lower part of the framing of the machine.

The driving crank pin when in operation is inclosed rotatably by a steel ball which operates in a chase carried upon the reciprocating rod, of the machine, and by the traveling of said crank and ball within said chase by the rotation of the crank, the reciprocating motion of the rod and file, or other cutting device is effected. The table whereon the metal or other material to be operated upon by filing or cutting is carried, is provided with a gage which may be set at any angle relatively with the file, saw, or other cutting instrument corresponding with the direction of the surface to be filed or cut.

Upon the annexed drawings, Figure 1 is a front elevation of the improved filing or cutting machine constructed according to my invention. Fig. 2, is a plan of the machine corresponding with Fig. 1, and having a portion of the table broken away. Fig. 3, is a side elevation of the filing and cutting machine corresponding to Figs. 1, and 2, and showing the sleeve, collar, and upper part of the stem in vertical section, also showing the method of attaching to the sleeve, a file having a tang of the ordinary shape and construction. Fig. 4, is a front elevation of the greater part of the driving disk showing the mechanical arrangement for adjusting the amount of throw of the crank pin. Fig. 5, is in part a section on the line *a, a,* Fig. 4, and in part an elevation of Fig. 4, looking in the direction of the arrow X. Fig. 6, is a plan upon a smaller scale of the upper part of the machine showing a piece of material thereon, also showing a hack-saw and frame in horizontal section, attached to the reciprocating stem in process of sawing the said material so as to form a miter joint, said section being taken on the line *a, a;* Fig. 7. Fig. 7, is a front elevation corresponding to Fig. 6. Fig. 8, is a plan of the upper part of the machine drawn upon a reduced scale, showing an attached hack-saw in the process of ripping a piece of material. Fig. 9, is a front elevation of the upper part of the machine drawn to a smaller scale, showing a piece of material thereon of octagonal form in cross section, also showing said material in process of being filed. Fig. 10, is a plan corresponding to Fig. 9. Fig. 11, is in part a side elevation and in part a vertical section upon the same scale as Fig. 1, showing a preferred form of construction of the lower part of the hack-saw frame, also showing the method of clamping very narrow saws therein as distinct from using perforated holes with a rivet or pin passing through corresponding holes in the hack-saw frame, and the holes in the saw as hitherto used. Fig. 12, is an inverted plan corresponding to Fig. 1.

As shown by Figs. 1, 2, and 3, my new or improved filing or cutting machine consists of the base portion 1, by which it is attached to a table, bench, wall, or other support by screws, bolts, or equivalent fastenings, connecting the flange 2, of the base 1, with said table, bench, wall or other support. From this base 1, there projects the lower part 3, of the framing of the machine, the form and arrangement of which is particularly shown at Figs. 1, 2, and 3. This projecting part 3, of the framing is constructed at its upper part with a tapped hole 4, into which the correspondingly screw-threaded set bolt 5, passes, and by means of this set bolt 5, which also passes through a slot 6, in the upper adjustable part 7, of the framing, the distance of the table 8, from the driving crank is adjusted and fixed from time to time as required. Toward the upper part of the member 3, of the framing, there projects rearwardly the block 9, which has a width corresponding to the width of the slot 6, and this projecting block 9, by reason of entering into the slot 6, prevents the upper portion 7, and the table 8, from being moved out of the vertical position, either when the bolt 5, is tightened or when the bolt 5, is loosened for the purpose of adjusting the position of this member 7, and the table 8. The head of the bolt 5, is preferably formed with a hole to receive the lever pin 10, which is used for enabling the bolt 5, being sufficiently tightened to maintain the member 7, and its connected parts in proper rigid operative position.

To the top of the member 7, there is pivoted the table 8, by a screw pin 11, as shown at Figs. 1, and 3, and from the under part of the table 8, there projects downward the semi-circular member 12, through which a set bolt 13, passes, provided with a wing nut 14. The stem 13ª, of the bolt 13, is of such diameter as to pass through the quadrantally curved slot 15, in the member 12, and through a hole in the member 7, so that when the wing nut 14, is tightened, the bolt 13, holds the table 8, in any position wherein it may have been adjusted for holding the material to be filed or cut. For the purpose of quickly adapting the position of the table 8, to any angle required for filing and cutting a piece of material held thereon, the upper curved face of the slot 15, has formed in it a series of indentations 16, whereinto a projection 17, upon the bolt 13, shown in dotted lines in Figs. 1, and 3, enters, so that when the bolt 13, is tightened by the wing nut 14, when the table has been placed in the adjustable position after loosening the wing nut 14, so as to enable the attendant to push the bolt 13, backward, the table is immediately thereafter fastened in the requisite adjusted position by the attendant pressing the head of the bolt 13, so that the projection 17, enters into the indentation 16, which is immediately behind it, and corresponding with the position whereinto the table 8, has been tilted. By again tightening the wing nut 14, and bolt 13, the table is rigidly held in the position required.

In Figs. 1, 2, and 3, the table 8, is shown in the horizontal position, but in Fig. 8, drawn on a smaller scale and hereinafter more particularly referred to, the table 8, is shown swung on its pivot 11, into the position necessary for filing or sawing a body of octagonal form. Fig. 9, illustrates in relation to Figs. 1, and 3, the means of tilting and rigidly holding the table 8, tilted into the position required.

In the framing 3, there is carried the bearing 18, for the shaft 19, by which the machine constituting my invention is operated. This bearing 18, is preferably constructed of a metallic tube as shown in Fig. 3, partly in full lines, and partly in dotted lines, as rigidly held in a socket between the upper and lower parts of the base 1. Through the tubular bearing 18, the shaft 19, passes, and at the outer end of the shaft 19, there is carried the speed pulley 20, a traveling belt passing over any one of the driving surfaces 21, 22, 23, by which the driving shaft 19, is rotated at any required velocity. At the inner end the driving shaft 19, carries the disk 24, which as the driving shaft 19, is rotated, also rotates therewith. This disk 24, is constructed with a parallel sided slot 25, therein, as shown more particularly at Fig. 4, wherein there is carried a block 26, slidably fitted within the parallel sides of the slot 25, and which block 26, is provided with a screw-threaded hole for engaging with the screw shaft 27. The inner end of the screw shaft 27, is of smaller diameter than the diameter of the screw portion thereof, and enters a recess in the driving shaft 19, as shown at Fig. 4. The outer end of the screw shaft 27, is formed with a square head whose outer end is flush with, or slightly beneath the periphery of the disk 24. A retaining plate 28, constructed with a recess 29, of sufficient size constitutes the upper bearing for the screw shaft 27, so that by applying a box key to the square outer end of the screw shaft 27, the sliding block 26, is moved inward or outward as required to regulate the throw or stroke of the filing or cutting instrument. In the block 26, there is carried the adjustable crank pin 30. This crank pin carries the spherical steel roller 31, whose diameter corresponds with the width and shape of the slot 25, as more particularly shown at Figs. 3, and 4, so that according to the adjustment of the crank pin 30, from the center of the driving disk 24, so is the throw or stroke of the crank, and therefore the stroke of the file, saw, or other cutting instrument regulated. The steel ball 31, fits into the circular pathway 32, formed in the pathway container constituted of the two parts 33, and 34. This pathway container is formed of the two parts 33, and 34, to enable adjustment of the pathway to be made from time to time when wear and tear of the pathway takes place by the operation of the spherical steel ball 31, rolling backward and forward therein during the successive rotations of the crank disk 24, when the machine is in operation. Such wear takes place both in the upper and lower parts of the pathway container 33, and 34, and these parts are held together by the screws 35, so that when the pathway becomes worn the screws 35, are removed and the parts 33, and 34, are filed or planed on those flat adjusting surfaces to bring the upper and lower parts of the pathway to correspond with the diameter of the steel ball 31. When the parts 33, and 34, constituting this pathway are in operative condition, they are firmly held upon the reciprocating shaft 36, by set screws 36ª, or otherwise, whereby through the means now last described, and shown upon the drawings, the file 37, or it may be other reciprocating cutting instrument, is put into reciprocating operation. The shaft 36, is carried in bearings 38, properly babbitted in the base 1, as shown at Fig. 1, and in the projecting member 39, forming the upper part of the base casting 1. The upper part of the reciprocating shaft 36, is formed with a cylindrical hollow 40, therein, as shown at Fig. 3, and in this hollow 40, there is carried the chuck or holder 41, by which the file or other cutting instrument is held in the reciprocating shaft 36. The means for holding the file or other cutting instrument consists of a ring 42, which surrounds the upper part of the reciprocating shaft 36 through a tapped hole therein, and through a hole in the side of the cylindrical hollow in the upper part of the shaft 36, a set screw 43, passes, so that when tightened its inner end presses upon the tang 44, of the file or other cutting instrument 37, and holds it firmly therein.

Upon the top of the table 8, as more especially shown by the plan Fig. 2, but also shown in dotted lines at Fig. 1, there is a parallel sided slot 45, whereinto the flat guide bar 46, of a set gage 47, is operated by the hand of the attendant, by being slid backward and forward therein. Upon this bar 46, there is carried the pivoted part of the gage 47ª. Upon the bar 46, is a pin which is provided with a wing nut 49, upon tightening which, the flat or front face 52, of the movable gage 47ª, is adjusted to the position corresponding with the required angle at which the material being operated upon in the machine is to be cut, by the reciprocating motion of the file 37, or by other cutting instrument, when the gage is pressed upon by the hand of the attendant and used to force the material to be cut, against the file 37, or other reciprocating cutting instrument.

In the pivoted part 47ª, of the gage, is a quadrantal slot 50, up through which the pin 51, passes, as shown at Figs. 1, 2, and 3, and this is the pin upon which the nut 49, is screwed tight. The gage bar 46, and the gage plate 47ª, carried thereon are readily moved by hand in the slot or groove 45, so as to bring the front edge 52, closer to or farther from the reciprocating file 37, as required, and this front edge or face of the gage plate 47ª, constitutes a support for material when being filed or cut. In place of the file 37, hereinbefore described, and shown at Figs. 1, 2, and 3, of the annexed drawings, I fasten into the cylindrically bored top of the reciprocating shaft 36, the lower saw retaining end of the hack-saw frame 53, as shown at Figs. 6, 7, 8, 11 and 12. The hack saw 54, is held at the lower end in the retaining block 56, by means of the set screw 55, as shown in section at Fig. 11. When the screw 55, is tightened, the inner end thereof presses the portion of the blade of the hack saw into the recesses 57, in the block 56. The block 56, forms the upper end of the stem 36ª, which fits into the socket 57, in the lower member of the hack-saw frame 53, and through the stem 36ª, is driven a pin 59, shown at Figs. 7, and 11, and when the block 56, is lowered the pin 59, is carried below the bottom of a collar 60, at the lower end of the hack-saw frame. When the pin 59, is released from the indentations 61, in the collar 60, then the block 56, and hack-saw retained thereby may be turned around to any position required relatively with the table of the machine, or relatively with the position of the material which is placed upon the table 8, for being cut by the hack-saw or other cutting instrument, for example, in Figs. 6, and 7, the parts constituting the retainer of the hack-saw 54, are in the position to hold the hack-saw so that it will cut a miter angle, that is to say, an angle of forty-five degrees across the piece of wood, metal, or other material 62, placed thereon as shown at Figs. 6, and 7, and it is obvious that the hack-saw frame, together with the hack-saw 54, may be held in the upper part of the reciprocating shaft 36, so as to cut material at any other required angle upon the table 8.

In Fig. 8, the hack-saw frame and the hack-saw are seen in plan in the position to cut a board or a piece of metal or other material parallel with the length thereof, as the board or other strip of material 63, is held against the straight face 52, of the gage 47<sup>a</sup>.

In Fig. 9, the table 8, is shown set at an angle of forty-five degrees, with the vertical file 37, which is carried in a chuck or holder 41, as hereinbefore described with reference to, and shown at Figs. 1, and 2, and it operates so as to cut the piece of material 65, into an octagonal form, the piece of material being supported in the position requisite for being cut to the octagonal angle by the front edge 52, of the gage plate 47<sup>a</sup>, which is also obvious from Fig. 10.

It is to be understood that although I have in Fig. 3, of the drawings shown the file 37, as being constructed with the ordinary tang of a file for fastening a file in the ordinary angle for being operated under, yet that I prefer to have the tang of the file cylindrical so as to fit properly and accurately into the tubular interior of the chuck or holder 41.

For the purpose of preventing the filings or dust of the filing and cutting operations performed by the machine hereinbefore described, from becoming deposited on the operative parts of the machine beneath the table 8, I fasten a hood 66, to the framing of the machine as shown in dotted lines at Figs. 1, and 3. Upon this hood the filings and other dust constituting the cuttings from the material being filed or cut fall, and are discharged outside the operative parts of the machine.

I desire it to be understood that although I have herein described a steel sphere carried upon the crank pin as the most perfect form of device for connecting the crank pin with the chase on the reciprocating bar, yet that I do not confine myself to the use of such steel sphere as a rectangular sliding block may be used instead of a sphere for being reciprocated in the chase on the reciprocating bar, in which case the chase is made rectangular to fit the said block as is obvious.

I claim as my invention,

In a machine of the nature set forth, the combination with a base having a vertically extending support mounted thereon, said support being provided with a sleeve at its upper terminal, a vertical rod adapted to reciprocate in said sleeve and said base, means mounted on said vertical support adapted to operate said rod vertically, a secondary vertical support adjustably mounted on said primary vertical support adjacent to the upper terminal thereof, a table pivoted to said secondary support, and means whereby said table may be adjusted radially.

In testimony whereof, I have hereunto set my hand and seal at the city of Los Angeles aforesaid, in the presence of two subscribing witnesses.

GEORGE HABIG. [L. S.]

Witnesses:
St. John Day,
Ida M. Daskam.